(12) United States Patent
Frank et al.

(10) Patent No.: US 6,694,486 B2
(45) Date of Patent: *Feb. 17, 2004

(54) METHOD AND APPARATUS FOR PRESENTING INFORMATION IN A DISPLAY SYSTEM USING TRANSPARENT WINDOWS

(75) Inventors: Edward H. Frank, Portola Valley, CA (US); Patrick J. Naughton, Palo Alto, CA (US); James Arthur Gosling, Woodside, CA (US); John C. Liu, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/139,704
(22) Filed: May 7, 2002
(65) Prior Publication Data

US 2002/0171682 A1 Nov. 21, 2002

Related U.S. Application Data

(63) Continuation of application No. 09/398,183, filed on Sep. 17, 1999, now Pat. No. 6,384,840, which is a continuation of application No. 08/719,317, filed on Sep. 25, 1996, now Pat. No. 5,999,191, which is a continuation of application No. 08/291,079, filed on Aug. 16, 1994, now Pat. No. 5,651,107, which is a continuation of application No. 07/991,857, filed on Dec. 15, 1992, now abandoned.

(51) Int. Cl.[7] ............................................. G06F 15/00
(52) U.S. Cl. ..................................................... 715/526
(58) Field of Search ................. 345/634, 629, 345/788; 715/502, 526

(56) References Cited

U.S. PATENT DOCUMENTS 4,533,910 A * 8/1985 Sukonick et al. ............ 345/806
4,555,775 A * 11/1985 Pike ........................... 345/790

(List continued on next page.)

FOREIGN PATENT DOCUMENTS

| EP | 0159400 | * 12/1984 |
|----|---------|-----------|
| EP | 0239884 | * 10/1987 |
| EP | 0280582 | * 2/1988 |
| EP | 0344082 | * 11/1989 |
| EP | 0524461 | * 7/1992 |

OTHER PUBLICATIONS

Article entitled: Created/Modification of the Audio Signal Processor Setup for a PC Audio Editor; publication of International Business Machines, IBM Technical Disclosure Bulletin, vol. 30, No. 10, Mar. 1988.*

(List continued on next page.)

*Primary Examiner*—Stephen S. Hong
(74) *Attorney, Agent, or Firm*—Finnegan, Henderson, Farabow, Garrett & Dunner, L.L.P.

(57) ABSTRACT

A central processing unit (CPU) is provided and is coupled to a display for displaying graphic and other data in multiple overlapping windows. The CPU is further coupled to one or more input devices which permits a user to selectively position a cursor and input and manipulate data within each of the windows on the display. The windows include defined areas having window features such as text, icons and buttons corresponding to functions to be executed by the CPU. Multiple applications may be executed concurrently by the CPU such that each application is associated with one or more windows. Each display element ("pixel") comprising the display is represented by multiple bits in a computer frame buffer memory coupled to the CPU. An alpha value ($\alpha$) is associated with the intensity of each pixel of the display, such that multiple images may be blended in accordance with a predefined formula utilizing the alpha values. By setting the alpha values appropriately, transparency may be accomplished such that data associated with underlying windows may be rendered visible to the user. Effectively, the present invention merges multiple images through alpha "blending" such that several images appear transparently on top of one another. The present invention, through the selective use of alpha blending, permits underlying windows to display data visible to the user through windows which are overlaid above an underlying window.

7 Claims, 9 Drawing Sheets

U.S. PATENT DOCUMENTS

| | | | | |
|---|---|---|---|---|
| 4,622,545 A | * | 11/1986 | Atkinson | 345/562 |
| 4,645,459 A | * | 2/1987 | Graf et al. | 434/43 |
| RE32,632 E | * | 3/1988 | Atkinson | 345/165 |
| 4,748,618 A | * | 5/1988 | Brown et al. | 370/419 |
| 4,772,882 A | * | 9/1988 | Mical | 345/823 |
| 4,785,408 A | * | 11/1988 | Britton et al. | 704/270 |
| 4,806,776 A | * | 2/1989 | Kley | 250/559.24 |
| 4,812,834 A | * | 3/1989 | Wells | 345/790 |
| 4,868,765 A | * | 9/1989 | Diefendorff | 345/797 |
| 4,884,223 A | * | 11/1989 | Ingle et al. | 702/41 |
| 4,893,116 A | * | 1/1990 | Henderson et al. | 345/592 |
| 4,896,291 A | * | 1/1990 | Gest et al. | 345/841 |
| 4,899,136 A | * | 2/1990 | Beard et al. | 345/156 |
| 4,914,732 A | * | 4/1990 | Henderson et al. | 340/3.71 |
| 4,918,625 A | * | 4/1990 | Yan | 345/592 |
| 4,931,783 A | * | 6/1990 | Atkinson | 345/163 |
| 4,939,507 A | * | 7/1990 | Beard et al. | 345/156 |
| 5,061,919 A | * | 10/1991 | Watkins | 345/806 |
| 5,062,060 A | * | 10/1991 | Kolnick | 345/800 |
| 5,072,412 A | * | 12/1991 | Henderson et al. | 345/804 |
| 5,091,717 A | * | 2/1992 | Carrie et al. | 345/806 |
| 5,101,365 A | * | 3/1992 | Westberg et al. | 345/807 |
| 5,109,481 A | * | 4/1992 | Lathrop et al. | 345/606 |
| 5,150,457 A | * | 9/1992 | Behm et al. | 345/420 |
| 5,155,806 A | * | 10/1992 | Hoeber et al. | 345/711 |
| 5,157,768 A | * | 10/1992 | Hoeber et al. | 345/711 |
| 5,170,443 A | * | 12/1992 | Todd | 382/274 |
| 5,185,808 A | * | 2/1993 | Cok | 382/284 |
| 5,216,755 A | * | 6/1993 | Walker et al. | 345/591 |
| 5,222,203 A | * | 6/1993 | Obata | 345/426 |
| 5,227,863 A | * | 7/1993 | Bilbrey et al. | 348/578 |
| 5,237,653 A | * | 8/1993 | Noguchi et al. | 345/797 |
| 5,260,695 A | * | 11/1993 | Gengler et al. | 345/592 |
| 5,265,202 A | * | 11/1993 | Krueger et al. | 345/797 |
| 5,283,560 A | * | 2/1994 | Bartlett | 345/729 |
| 5,339,386 A | * | 8/1994 | Sodenberg et al. | 345/422 |
| 5,351,067 A | * | 9/1994 | Lumelsky et al. | 345/561 |
| 5,363,475 A | * | 11/1994 | Baker et al. | 345/422 |
| 5,404,316 A | * | 4/1995 | Klingler et al. | 345/723 |
| 5,479,603 A | * | 12/1995 | Stone et al. | 345/804 |
| 5,561,811 A | * | 10/1996 | Bier | 710/5 |
| 5,581,670 A | * | 12/1996 | Bier et al. | 345/856 |
| 5,617,114 A | * | 4/1997 | Bier et al. | 345/634 |
| 5,651,107 A | * | 7/1997 | Frank et al. | 345/768 |
| 5,729,704 A | * | 3/1998 | Stone et al. | 345/804 |
| 6,384,840 B1 | * | 5/2002 | Frank et al. | 345/634 |

OTHER PUBLICATIONS

Article entitled: Browsing Within Time–Driven Multimedia Documents; authors: Stavros Christodoulakis and Steven Graham; publication of the Institute for Computer Research, University of Waterloo, Waterloo, Ontario, Canada, Jul. 1988.*

Alexander, "Visualizing cleared–off desktops," Computer=World, May 6, 1991, p. 20. Hiroshi Ishii, Kazuho Arita, "Clearface: Translucent Multiuser Interface for Team Work Station," ECSCW, Sep. 1991, pp. 6–10.*

Hiroshi Ishii, Naomi Miyaka, "Toward an Open Shared Workspace," Communications of the ACM, Dec. 1991, vol. 34, No. 12 pp. 37–50.*

IBM Technical Disclosure Bulletin, vol. 30, No. 1, Apr. 1988, New York, pp. 268–270.*

Software Practice & Experience, vol. 21, No. 4, Apr. 1991, Chichester, GB, pp. 375–390.*

The Third International Conference on Industrial and Engineering Applications of Artificial Intelligence and Expert Systems, vol. 1, Jul. 15, 1990, Charleston, SC, pp. 341–349.*

IBM Technical Disclosure Bulletin, vol. 15, No. 9, Feb. 1973, New York, US, pp. 2721–2722.*

Blatt, Jeffrey, J., "A Printer on User Interface Software Patents," The Computer Lawyer, vol. 9, No. 4 (Apr. 1992).*

W. Teitelman, "Ten Years of Windows Systems—A Retrospective View," Methodology of Window Management-(Springer–Verlag, New York 1986), pp. 35–46.*

R. Pike, "Graphics in Overlapping Bitmap Layers," ACM Transactions on Graphics, vol. 2, No. 2 (Apr. 1983).*

N. Meyrowitz & M. Moser, "Bruwin: An Adaptable Design Strategy for Window Manager/Virtual Terminal Systems," 1981 ACM 0–89791–062–1–12/81–0180.*

"Microsoft Windows User's Guide for the Windows Graphical Environment Version 3.0," Microsoft Corp. (1990), pp. 34–55.*

"Microsoft Windows User's Guide for the Windows Graphical Environment Version 3.0," Microsoft Corp. (1990), pp. 54, 55, and 84–86.*

Patrick P. Chan, "Learning Considerations in User Interface Design: The Room Model," Software Portability Laboratory, University of Waterloo, Waterloo, Ontario, Canada, Jul. 1984.*

"Transparent Window Selection", IBM Technical Disclosure Bulletin, Apr. 1998, vol. 30, Issue 11, pp. 268–270.*

* cited by examiner

METHOD AND APPARATUS FOR PRESENTING INFORMATION IN A DISPLAY SYSTEM USING TRANSPARENT WINDOWS

This is a continuation of application Ser. No. 09/398,183, filed Sep. 17, 1999, which issued on May 7, 2002, as U.S. Pat. No. 6,384,840; which is a continuation of application Ser. No. 08/719,317, filed Sep. 25, 1996, which issued on Dec. 7, 1999, as U.S. Pat. No. 5,999,191; which is a continuation of application Ser. No. 08/291,079, filed Aug. 16, 1994, which issued on Jul. 22, 1997, as U.S. Pat. No. 5,651,107; which is a continuation of application Ser. No. 07/991,857 filed Dec. 15, 1992, which was abandoned.

BACKGROUND OF THE INVENTION

1. Field of the Invention

The present invention relates to apparatus and methods for displaying and manipulating graphic information, and more particularly, the present invention relates to a computer controlled display system for displaying overlapping windows of data on a display.

2. Art Background

It is common for computer systems incorporating so-called "object oriented" display systems to utilize multiple "windows" on a display in which combinations of text and graphics are disposed to convey information to a user. The windows may take the form of a variety of objects such as a file folder, loose leaf binder, or simple rectangle, and the windows may overlap one another with the "top" window fully visible constituting the current work file.

It is generally believed that one origin of the object oriented display systems is a system known as "Smalltalk". The Smalltalk approach is to replace many previously commonly coded programming commands with two-dimensional, or three-dimensional, graphics and animation on a computer display. It has been found that most people readily think in terms of images, and a person can absorb and manipulate information presented in a visual context faster than if represented by text. The particular type of graphic interface by which the user interacts with the machine may vary for any given application. For example, many of the object oriented display systems utilize various icons which symbolically indicate the type of operation the computer system will execute if the icon function is chosen. The icons are displayed in conjunction with the windows. In a window based display system, the user may delete information from the window, move data from one window to another, and generally operate on the window as if an actual file or the object is being manipulated. A variety of object oriented systems exist today, and are displayed on computers manufactured by the assignee, Sun Microsystems, Inc., as well as other manufacturers. The ability to operate on images which relate the user to actual objects on, for example, a desktop, results in a stronger man-machine interface. See, for example, D. Robson, "Object-Oriented Software Systems", BYTE, August 1981, p.74, Vol. 6, No. 8; L. Tesler, "The Smalltalk Environment", BYTE, August 1981, p.90, Vol. 6, No. 8; and Smith, et al., "Star User Interface; An Overview", National Computer Conference, 1982.

Modern object oriented window based display systems are made possible, in part, through the use of bit-mapped frame buffer display memories. In a bit-map display system, a display element (referred to as a "pixel") on the display screen is represented by one or more bits in a frame buffer memory. In its simplest form, a block of memory may be allocated in a data processing storage system with each memory bit (a 0 or 1) mapped onto a corresponding pixel on the display. Thus, an entire display screen full of data, in the form of images and/or text, is represented as either a 1 or a 0 in the frame buffer memory. In systems with multiple bits, typically at least eight, it is possible to vary the intensity and color of the pixels on the display.

Over the past ten years, a variety of systems have been developed to generate window based graphic user interface (GUI) displays. Many systems permit multiple overlapping windows to be displayed, wherein each of the windows represents a different application software program being executed by a processor coupled to the display system. In some systems, the application programs may be executing simultaneously, although the user operates only on the application program represented by the top window. In addition, in many cases only the top window is fully visible to the user with the windows underneath being fully or partially obscured. Thus, although the lower obscured windows may represent active application programs, the user is unable to fully observe the execution of the program since the top window obscures those windows which it overlaps (See, for example, U.S. Pat. No. 4,555,775, Issued November 1985 for a system which utilizes concurrent execution of multiple windows).

As will be described, the present invention uses a graphic display technique known as "transparency" to increase the amount of information presented in a window based system. Using traditional overlapping window concepts, the present invention utilizes a transparency mechanism to present information, such that the user can "see through" certain windows to view underlying data and processes that would normally be obscured.

SUMMARY OF THE INVENTION

An apparatus and method is disclosed which has application for use in computer display systems, and in particular, display systems having object oriented graphic user interfaces with overlapping windows. A central processing unit (CPU) is provided and is coupled to a display for displaying graphic and other data in multiple overlapping windows. The CPU is further coupled to one or more input devices which permits a user to selectively position a cursor and input and manipulate data within each of the windows on the display. The windows include defined areas having window features such as text, icons and buttons corresponding to functions to be executed by the CPU. Multiple applications may be executed concurrently by the CPU such that each application is associated with one or more windows. Each display element ("pixel") comprising the display is represented by multiple bits in a computer frame buffer memory coupled to the CPU. An alpha value ($\alpha$) is associated with the intensity of each pixel of the display, such that multiple images may be blended in accordance with a predefined formula utilizing the $\alpha$ values. By setting the $\alpha$ values appropriately, transparency may be accomplished such that data associated with underlying windows may be rendered visible to the user. Effectively, the present invention merges multiple images through a "blending" such that several images appear transparently on top of one another. The present invention, through the selective use of a blending, permits underlying windows to display data visible to the user through windows which are overlaid above an underlying window.

Accordingly, rather than all windows obscuring other underlying windows, each window (or "object") of the display system of the present invention has an $\alpha$ value associated with it which may be selectively set. In this way, windows do not need to be clipped with respect to one another, as required in the prior art. The windows are "blended" using the α values to achieve a desired level of transparency. In one embodiment, a slider is displayed within each window which permits the α value to be set by a user through the use of a cursor control device. The α value may be set between the range of 0 and 1, where a setting of 1 results in the window being opaque, and a 0 setting resulting in the window being fully transparent. In addition, a window selection method is disclosed to permit a user to render a window "active" and operate on its contents without disturbing the current window order on the display.

NOTATION AND NOMENCLATURE

Figure 1:
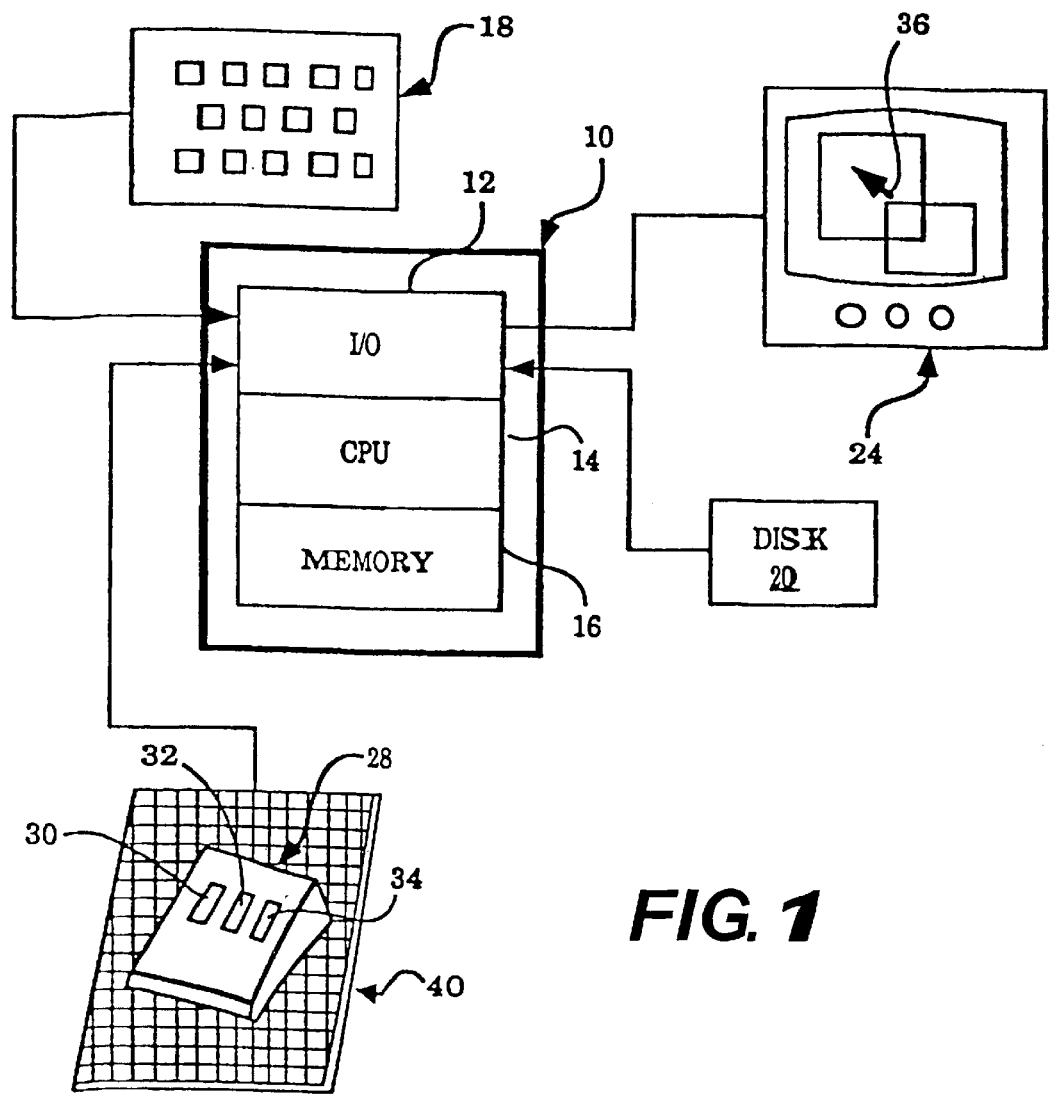
FIG. 1 illustrates a computer incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Sun Microsystems, Inc., as well as other manufacturers of computer systems.

DETAILED DESCRIPTION PRESENTLY PREFERRED AND ALTERNATE EMBODIMENTS

The present invention discloses apparatus and methods for displaying graphic information in a window based system on a computer display. In the following description, numerous specific details are set forth such as computer system configurations, window elements, icons, etc. in order to provide a thorough understanding of the present invention. However, it will be apparent to one skilled in the art that the present invention may be practiced without these specific details. In other instances, well known circuits and structures are not described in detail in order not to obscure the present invention unnecessarily.

FIG. 1 illustrates a computer based system for generating a window based graphic user interface in accordance with the teachings of the present invention. Shown is a computer 10 which comprises three major components. The first of these is an input/output (I/O) circuit 12 which is used to communicate information in appropriately structured form to and from other portions of the computer 10. In addition, computer 10 includes a central processing unit (CPU) 14 coupled to the I/O circuit 12 and a memory 16. These elements are those typically found in most general purpose computers and, in fact, computer 10 is intended to be representative of a broad category of data processing devices. Also shown in FIG. 1 is a keyboard 18 to input data and commands into computer 10, as is well known. A magnetic disk 20 is shown coupled to I/O circuit 12 to provide the additional storage capability for the computer 10. It will be appreciated that additional devices may be coupled to computer 10 for storing data such as magnetic tape drives, bubble memory devices, as well as networks which are in turn coupled to other data processing systems. As is well known, disk 20 may store other computer programs, characters, routines, etc., which may be accessed and executed by CPU 14. A raster display monitor 24 is shown coupled to the I/O circuit 12 and is used to display images generated by CPU 14 in accordance with the present invention. Any well known variety of cathode ray tube (CRT), liquid crystal, or other displays may be utilized as display 24. A cursor control device 28 is also shown coupled to computer 10 through I/O circuit 12. Cursor control device 28 includes switches 30, 32 and 34 for signaling CPU 14 in accordance with the teachings of the present invention. Cursor control device 28 (commonly known as a "mouse") permits a user to select various command modes, modify graphic data, and input other data utilizing switches 30, 32 and 34. More particularly, cursor control device 28 permits a user to selectively position a cursor 36 at any desired location on display 24 by movement of the cursor control device 28 over a surface 40. In the presently preferred embodiment, cursor control 28 utilizes a well known optical method for signaling CPU 14 of positional changes of cursor 36 by movement of cursor control over a grid disposed on surface 40. However, it will be appreciated that a variety of well known cursor control devices may be utilized by the present invention, including other control devices such as mechanical mice, track balls, joy sticks, etc.

Figure 2:
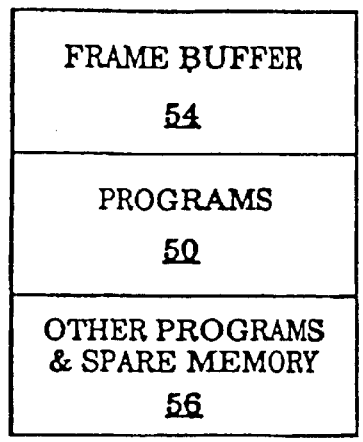
FIG. 2 shows one arrangement of program storage for the system illustrated in FIG. 1.

FIG. 2 shows one arrangement of major programs contained within the memory 16 illustrated in FIG. 1. In particular, there is shown a frame buffer 50, which comprises a bit map of display 24. The frame buffer 50 represents the video memory for the display 24, wherein each storage location comprising a plurality of bits in the frame buffer 50 corresponds to a pixel on the display 24. Thus, the frame buffer comprises a two dimensional array of points having known coordinates corresponding to the pixels on the raster display. In its simplest form, frame buffer 50 comprises a contiguous block of memory which is allocated such that each memory location is mapped onto the corresponding pixel on the rastor display 24. Memory 16 also includes a variety of other programs 54 for execution by the CPU 14. For example, a variety of control, display, and calculating programs implementing the operations and routines described in this Specification may be stored in memory 16, as well as monitor control programs and disk operating systems. Moreover, memory 16 further includes space for other programs and spare memory 56 which may be used for a variety of other well known functions and operations in data processing systems.

Figure 3:
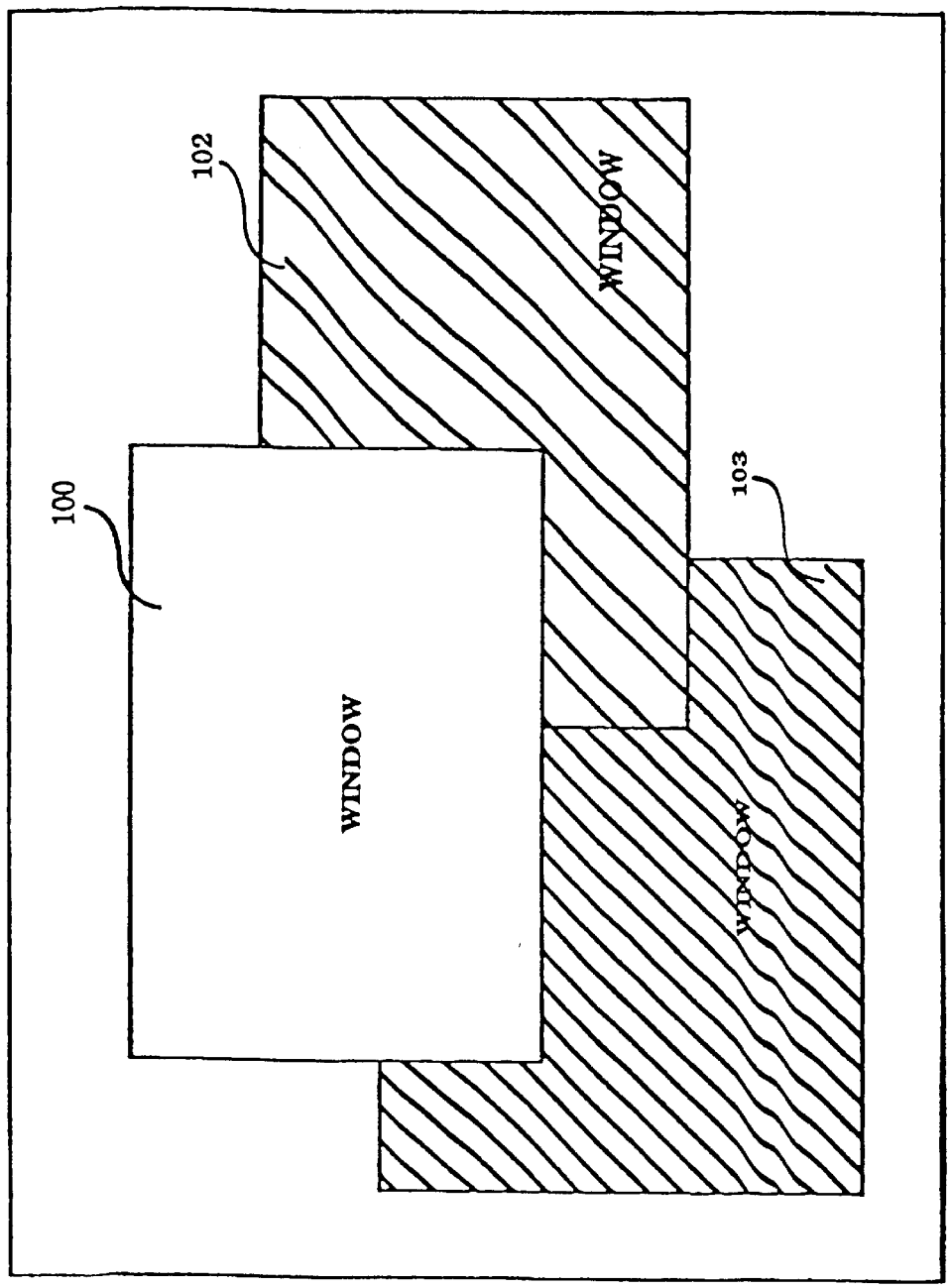
FIG. 3 illustrates a prior art window based system requiring window clipping for overlapping windows.

Referring now to FIG. 3, a conceptual illustration of a prior art window based display system is shown. As illustrated, a top active window 100 overlays a window 102, which in turn overlays a window 103. In certain computer systems, the only active window being updated by the CPU 14 of FIG. 1 would be window 100. Other systems concurrently execute multiple programs resulting in constant updates to data disposed within window 100, window 102, and window 103. However, in prior art window based systems, the windows have a spatial hierarchy such that the window on top (window 100) obscures all, or portions of, the windows below them (window 102 and window 103). As such, prior art display systems must incorporate the use of window clipping techniques to appropriately obscure, and thereby clip, the windows such that nonvisible data is not displayed since it is obscured by overlapping windows. A variety of methods have been devised over the years to achieve window clipping (See for example, U.S Pat. No. 4,622,545, Issued Nov. 11, 1986).

In traditional window based display systems, a user operating on data disposed in window 100 would have to select a window to operate upon. In many current generation window display systems, the user places the cursor 36 in the area comprising window 103, and momentarily depresses ("clicks") switch 34 on mouse 28, to bring that window to the top and operate on data within window 103. In prior art based window systems, the user is unable to view data obscured by overlapping windows, and thereby monitor the progress or operate on programs represented by the underlying windows while actively operating on data in the top window 100. For example, as shown in FIG. 3, areas of windows 102 and 103 are obscured, rendering data in these areas unusable to the user.

Figure 4A:
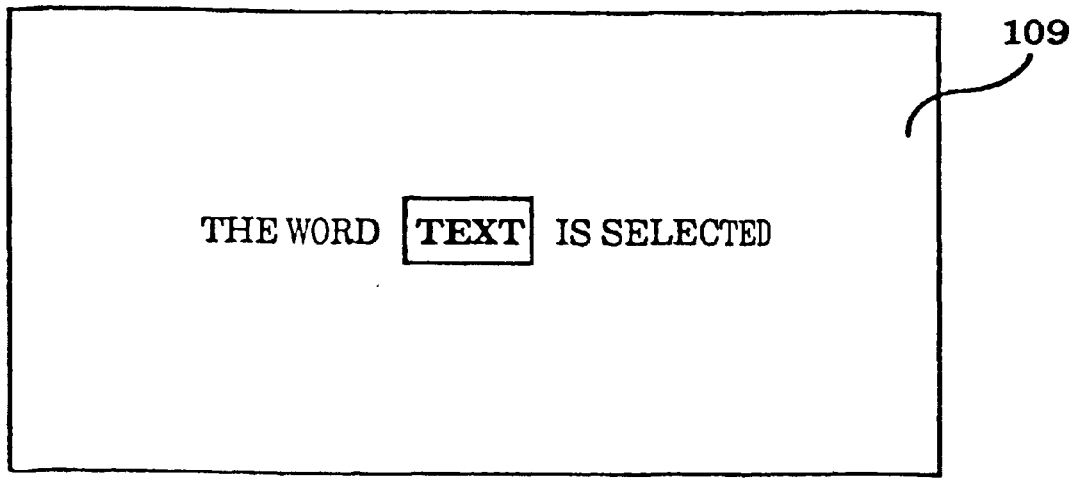
FIGS. 4a and 4b illustrate a prior art window based system in which working text is obscured by a popup menu.
Figure 4B:
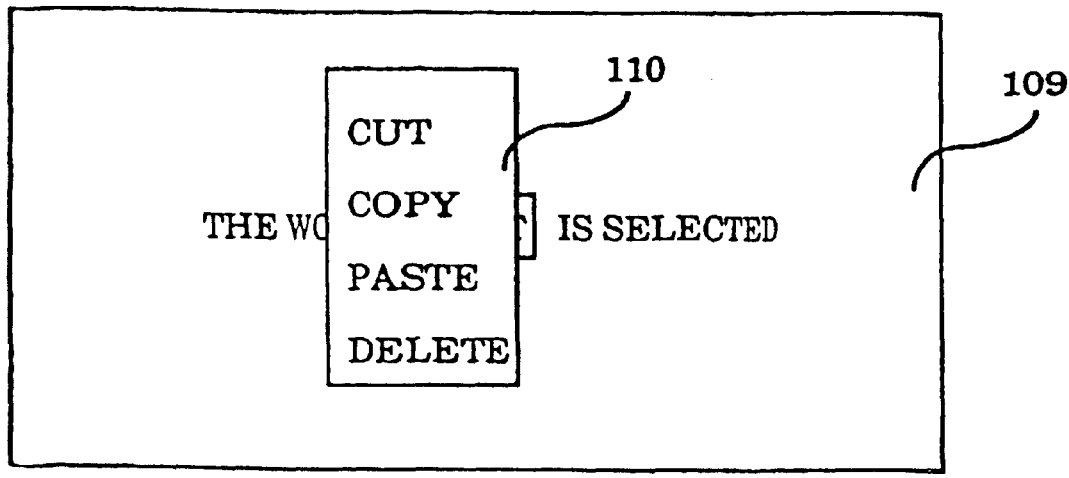

Referring now to FIGS. 4a and 4b, an example of the problem of obscured windows in a prior art system is illustrated. FIG. 4a illustrates a portion of a prior art word processing system in which the user desires to operate upon the word "text". The user highlights the word "text" using a cursor control device, such as mouse 28 of FIG. 1. In certain word processing systems, the selection of a word such as "text" of FIG. 4a results in a pop-up menu 110 being displayed. The pop-up menu 110 identifies the operations on sub-commands available to a user. As illustrated in FIG. 4b, pop-up menu 110 obscures the word "text" being operated upon. In the example illustrated, the pop-up menu 110 constitutes a (albeit a small) window which obscures a portion of the text disposed in the underlying word processing window 109.

For purposes of this patent and invention, a "window" may be a traditional rectangular region on a display in which data is displayed, as well as smaller sub-regions, such as pop-up, pull-down or other menus, icons, symbols or other display elements, and objects, generally. In the case of objects such as icons, the "data" displayed in the object may comprise only the pixels defining the icon. In objects such as rectangular windows, menus or sub-menus, the data displayed in such objects may include alpha numeric and/or graphic data. Accordingly, it will be appreciated that the apparatus and method of the present invention has application to any object displayed on the display 24, regardless of the shape, size or function of the object in any particular computer display system.

Figure 5:
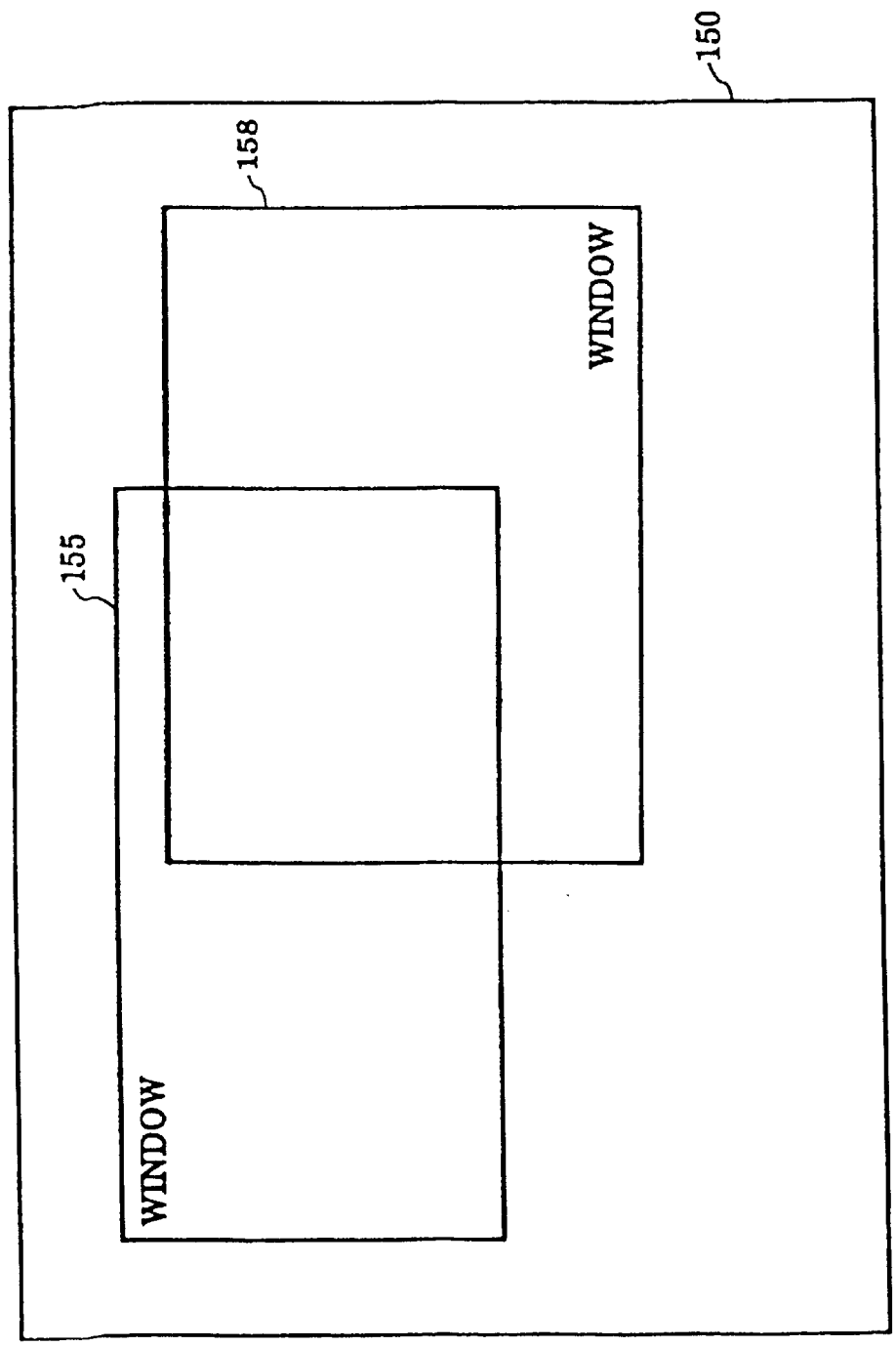
FIG. 5 conceptually illustrates the present invention's use of overlapping transparent windows.

Referring now to FIG. 5 the present invention is conceptually illustrated with reference to a display 150 having a top window 155 and a window disposed "under" window 155 identified by the numeral 158. As previously discussed, each pixel of the display 150 is represented by multiple bits in the frame buffer 50. A common technique for blending images is referred to as "α blending", in which two images may be blended on a pixel by pixel basis according to the formula:

$$\alpha \cdot X + (1-\alpha) \cdot Y$$

where α is a number that ranges from 0 to 1. When α is a 1, the pixel will contain only the X input value, when α is a 0, the pixel will contain only Y image input. When α is disposed between 1 and 0, it will contain both X and Y image information. For example, if α is 0.1, then the image on the screen will appear to be the Y image with the faint image of the X image. The visual look and feel is that the X image appears as though it is transparent, and that one can see through X and also see the Y image.

Referring once again to FIG. 5, in a two window display system, where window 155 represents the A window, window 158 represents a B window, and where C represents the entire display area 150 of the display screen:

for all pixels where $$A \cap B \{ C \leftarrow B(1-\alpha) + A\alpha \}$$

where α=the transparency of A

Accordingly, multiple images can be merged, and appear transparently on top of one another. In addition, it will be appreciated by one skilled in the art that the exact nature of the α blend operation will depend on the visual effect desired, as well as the number of bits per pixel in the intensity domain available (See also, Foley, VanDam et al. "Computer Graphics Principles and Practice", 2nd Edition (Addison Wesley 1990) for additional information on transparency techniques).

In addition, the images within each window 155 and 158 need not have the same α value for every pixel. In fact, the center of a graphic object Within, for example window 155, may have an α value of 1 (i.e., it fully obscures the object it is blended with), while the edges may have an α value less than 1. The effect is that the edges of the graphic object within window 155 are blurred with what is "behind" them, and thus appear smoother.

Using the teachings of the present invention, it is possible to define different α values on an object by object basis. For example, within a window objects can be identified, and their transparency can be defined, using a pixel based mask α table. In the example below, four pixels are associated with each source (source 1 and source 2), wherein each pixel has an α value which can be independently set. The pixel mask includes α values, m1,m2,m3, and m4. The results d1,d2,d3, and d4 represent the pixel mixing of source1 and source2, on a pixel by pixel basis, as described below.

EXAMPLE

| source 1 | source 2 | mask | result |
|---|---|---|---|
| \|x1 x2\|<br>\|x3 x4\| | \|y1 y2\|<br>\|y3 y4\| | \|m1 m2\|<br>\|m3 m4\| | \|d1 d2\|<br>\|d3 d4\| | source 1 has 4 pixels: x1, x2, x3 and x4
source 2 has 4 pixels: y1, y2, y3 and y4 a two-dimensional array mask also defines the weighting for each pixel where $$d1 = x1*m1 + y1*(1-m1) \quad d2 = x2*m2 + y2*(1-m2)$$
$$d3 = x3*m3 + y3*(1-m3) \quad d4 = x4*m4 + y4*(1-m4)$$

It will be appreciated that the above example for pixel mixing uses the case of four pixels for simplicity of description. The present invention's method may be used with N pixels for each source, wherein each source is provided with an α mask table having the same pixel resolution as the source. In the case of N sources, there will be a corresponding N masks.

Furthermore, since each pixel from a source has associated with it an α value in the mask, it is possible to group pixels representing an object and selectively vary the object's degree of transparency. An example of the grouping of pixels to represent an object is illustrated with respect to the file folder 225, and the airplane 220, in FIG. 7, described below.

Using the teachings of the present invention in a window system running on a multiple bit per pixel display, and where a multitude of intensities are available per pixel, each window has an α value associated with it. In this way, windows need not be clipped with respect to one another, but rather, they are simply blended using a technique as noted above with respect to FIG. 5. Of course, the windows may still need to be clipped with respect to the edge of the display screen. In accordance with the present invention, if a traditional window system is desired, wherein the top window obscures windows which it overlays, the α value of a window is set to 1 whenever a window is visible, and a 0 where it is obscured. To implement windows that are fully or partially transparent, the user, or alternatively an automatic routine within the program, sets the α value as appropriate for the desired level of transparency. It will be noted that the α value may represent any arbitrary function, and the value may be scaled to any integer (in the present example 0 to 1).

Figure 6:
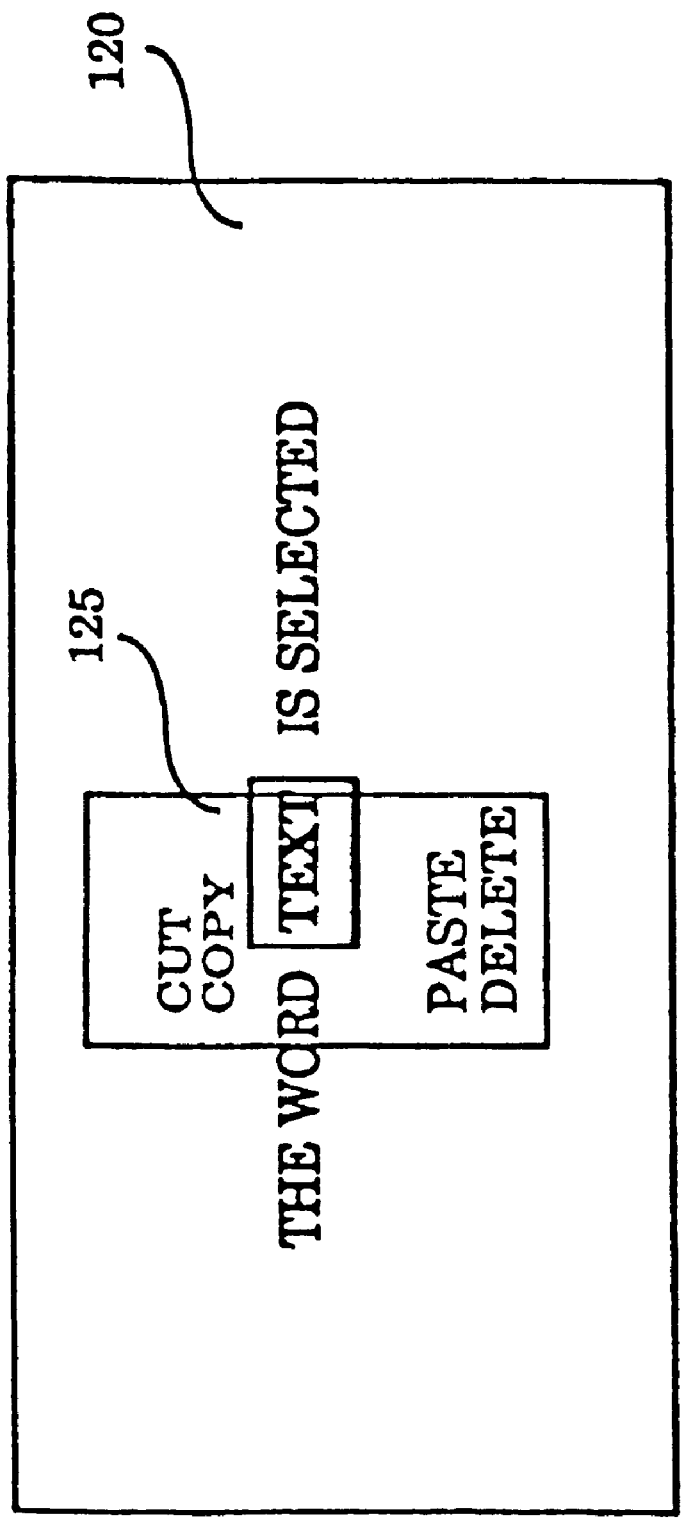
FIG. 6 illustrates an application of the present invention to the prior art system illustrated in FIGS. 4a and 4b.

Referring now to FIG. 6, a simple example of the present invention's use of transparency and overlapping windows is illustrated. In FIG. 6, a window 120 containing word processing text is illustrated. As in the example illustrated in FIGS. 4*a* and 4*b,* the word "text" is selected by a user using a cursor control or other input device. A popup menu 125 is generated and displayed which contains a variety of word processing options or sub-commands the user may use to operate on the selected word. However, in accordance with the teachings of the present invention, the α value for the popup window 125, is set such that window 125 is partially transparent, thereby permitting the user to see both the pop-up window 125 as well as the underlying words within the word processing document which would otherwise be obscured. By allowing the menu 125 to have an α value less than 1, for example 0.3, the menu 125 will remain readable to the user, while the information "behind" the popup menu 125 is still visible.

Figure 7:
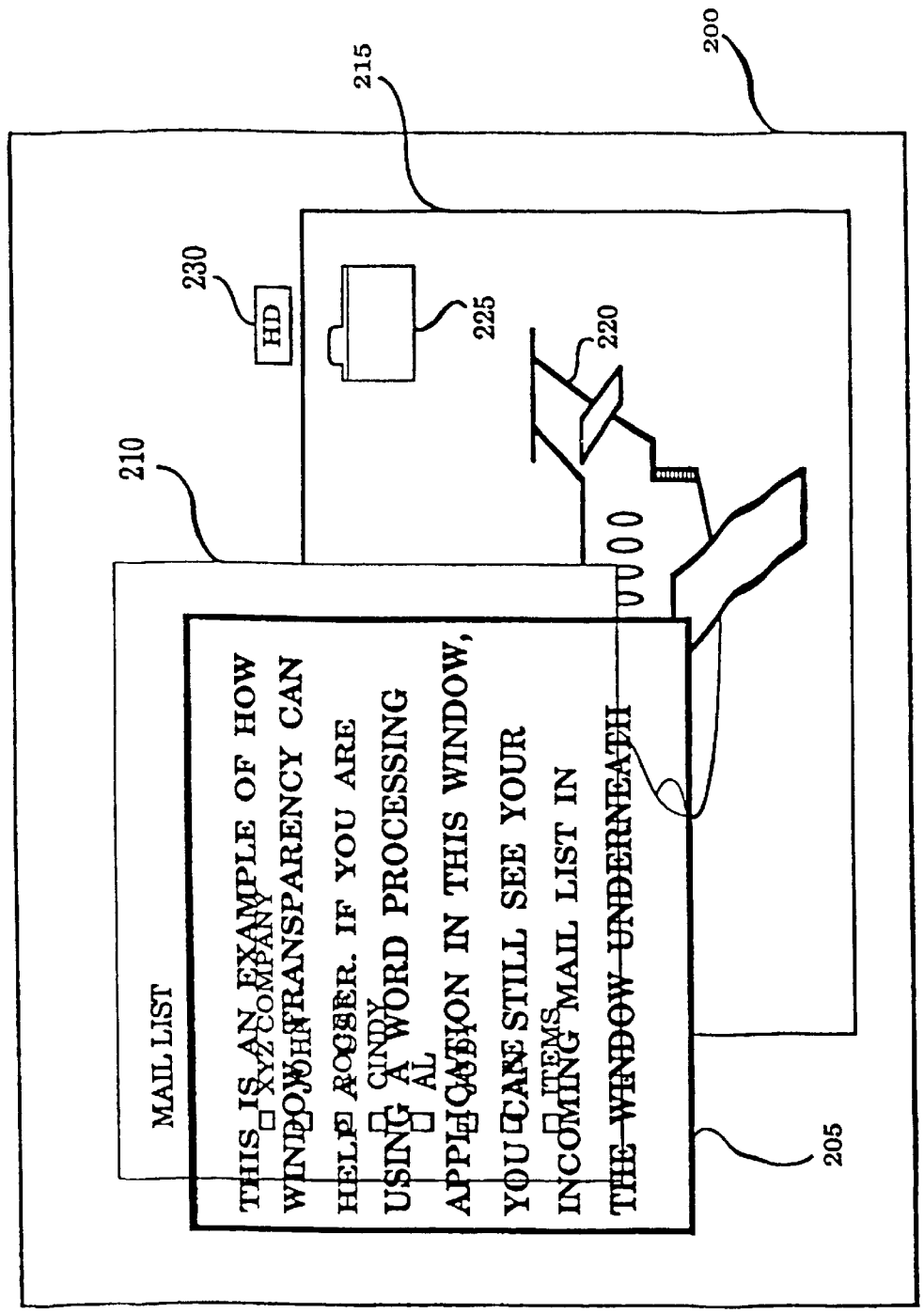
FIG. 7 illustrates an application of the present invention wherein certain data disposed in windows under the active top window are visible to the user through the selective use of transparency.

Referring now to FIG. 7, another example of the present invention is illustrated. A display 200 includes three windows, namely, a top window 205, an intermediate window 210 and a bottom window 215 all overlapping as shown in the figure. As can be seen, window 215 includes a graphic representation of an airplane 220 and an icon 225 in the shape of a file folder. The α value for the pixels comprising the graphic representation of the airplane 220 has been set to a value of 1. Therefore, that portion of window 215 comprising the graphic representation of the airplane 220 implements a traditional window system while pixels in peripheral areas of window 215 have been set to a value less than 1. As illustrated, the icon 230 identified as "HD" represents an icon which is not obscured by any window and has also been given an α value set equal to 1. However, the icon 225 is "behind" and obscured by window 215, but the icon 225 is still visible to the user through window 215 since the pixels in the periphery of window 215 have α values less than 1. In other words, to achieve transparency, the α value for window 215 over that portion of the display obscuring icon 225 has been set to α value less than 1 (for example 0.3). Thus, the Icon 225 is visible since that portion of window 215 has been rendered transparent through the appropriate setting of the α value.

Referring now to window 205 of FIG. 7, this window conceptually illustrates a window in which word processing application is being executed. As shown, the text of the window is clearly visible and being operated upon by the user. Since window 205 is on "top" of windows 210 and 215, window 205 is designated as the "active" window in this example. As illustrated, window 210 is disposed immediately "below" active window 205. In FIG. 7, window 210 represents an electronic mail program which lists current mail messages being stored and identifies new mail messages received. In prior art systems, the mail list comprising the list of mail messages would be obscured by window 205. In order for a user to view the mail list in window 210, the user would have to render the window 210 the "active" window and bring it to the "top" such that it overlaid window 205. However, by appropriately setting the α value for the pixels comprising window 205, the mail list displayed in window 210 is visible as a "ghost" image through the window 205. As such, a user may operate upon the data displayed in the word processing window 205 while viewing the mail list displayed in window 210. If an incoming message is of interest to the user, the user may view, and thereby identify, the incoming message in the mail list of window 210 without the necessity of dismissing window 205 or bringing window 210 to the "top" of the desktop.

Accordingly, it will be appreciated by one skilled in the art that through the selective setting of α values for pixels comprising windows on a display that data in desired windows may be rendered visible, even if obscured by overlaying windows. The setting of the α value may be under program or user control depending on how the invention is utilized, as will be described more fully below.

Figure 8:
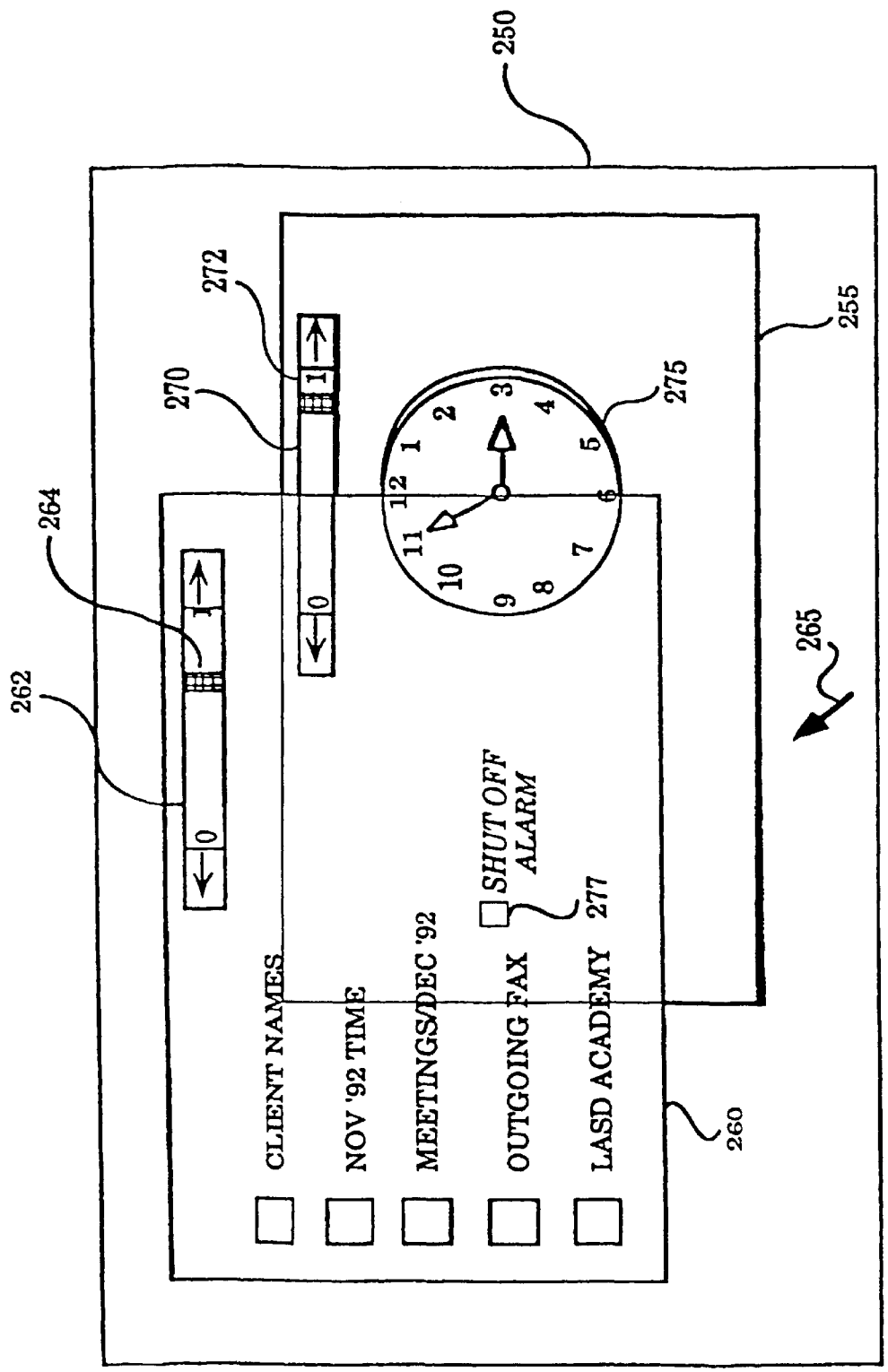
FIG. 8 illustrates an application of the present invention in which a user may select the transparency of each window.

Referring now to FIG. 8, there is shown a display 250 having windows 255 and 260 displayed therein. As shown, window 260 overlays window 255 in FIG. 8. Window 260 includes a slider 262 which permits the setting of the α value for window 260 between 0 and 1. In operation, a slider bar 264 is moved selectively by a user using a cursor control device, such as cursor control device 28 of FIG. 1. Similarly, window 255 includes a slider control 270 with a slider bar 272. In the present example, window 260 comprises a window displaying the names of files accessible to a word processing document such as "Client Names", "November 1992 time", and the like. Window 255 is a clock program to provide the current time to a user through the display of an analog clock face. It will be appreciated that in prior art window based systems, window 260 would obscure a portion of a clock face 275 displayed within window 255. Thus, it is very inconvenient if the user desires to read the current time from clock face 275, since window 255 would be partially obscured by window 260. Only by dismissing window 260, or rearranging the position of the windows on the display 250, could the user read the time.

Utilizing the teachings of the present invention, the prior art problem of obscured windows is eliminated. In the example illustrated in FIG. 8, the α value for window 260 is set to a value of less than 1 (approximately 0.8) by the user positioning the slide bar 264 using, for example, the mouse 28. It is contemplated that the user may set the slide bar 264 by placing a cursor 265 in FIG. 8 over a portion of the slide bar 264, depressing a switch, such as switch 34 on the mouse 28 (See FIG. 1), move the slide bar to an appropriate position on the slider 262, and release switch 34. As shown in FIG. 8, since the α value for window 260 has been set less than 1, window 260 is rendered partially transparent, thereby allowing a user to view the entire clock face 275 displayed in window 255. As shown, slide bar 272 has been set such that the α value for window 255 is equal to 1. Accordingly, window 255 comprises a traditional window which is not transparent.

Figure 9:
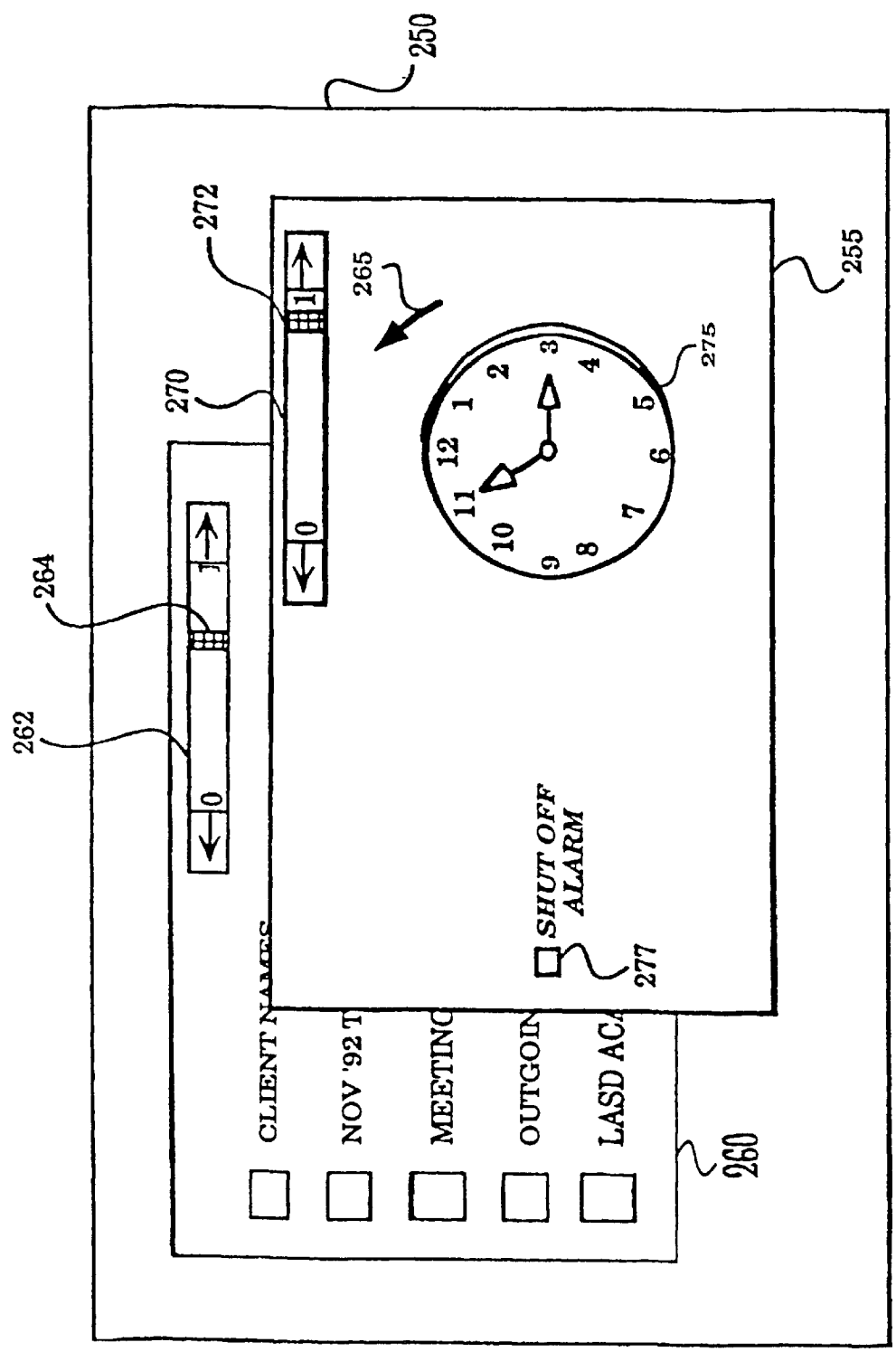
FIG. 9 illustrates an application of the present invention wherein a window is selected, converted to a "top" window and rendered active.

Assume for sake of example that an alarm associated with clock 275 sounds which the user desires to shut off. As shown in FIG. 8, window 255 includes a shut off alarm box 277 which is visible to the user through window 260. In one embodiment of the present invention, to obtain access to the shut off alarm box 277, it is necessary for the user to render window 255 the top "active" window. Using a common window selection technique, the cursor 265 is placed within the region of window 255 using mouse 28, and the user signals the CPU 14 of the window selection. In many window based systems, the user signals CPU 14 by clicking a switch, such as switch 34, on mouse 28, and the CPU 14 then re-renders windows 255 and 260 in display 250, such that window 255 now overlays window 260 as shown in FIG. 9. The user then has full access to window 255, and can place the cursor 265 over the shutoff alarm box 277 and "click" to terminate the alarm.

Although it is traditional to bring all active windows to the top in a window based system prior to operating upon them, utilizing the teachings of the present invention, it is not necessary.

Figure 10:
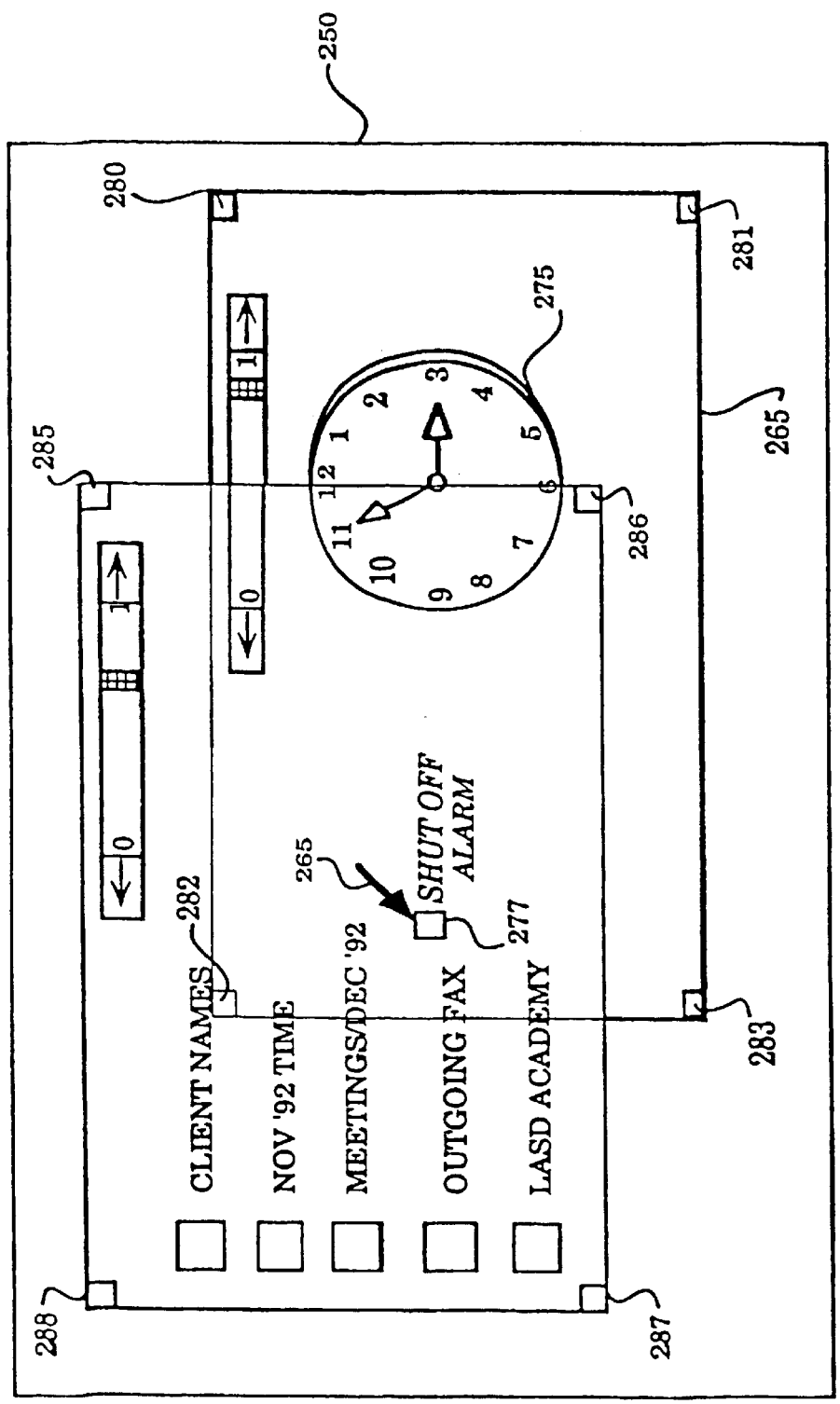
FIG. 10 illustrates an application of the present invention where an underlying window is rendered active but operated upon through an overlying window.

Referring now to FIG. 10, windows 255 and 260 are once again illustrated as being displayed in display 250. However, it will be noted that active window selection buttons 280, 281, 282 and 283 have been added to the four corners of window 255. Similarly, buttons 285, 286, 287 and 288 have been added to the four corners of window 260, as shown. By placing cursor 265 over one of the buttons 280 to 283 in window 255, or one of buttons 285 to 288 for window 260, and momentarily depressing switch 34 on mouse 28 as previously described, either window 255 or window 260 may be selected without altering the relative position of the windows on the display 250. For example, if a user desires access to shut off alarm box 277 but does not wish to bring window 255 to the top, the user simply places cursor 265 over one of buttons 280 through 283, and signals the CPU 14 by "clicking" switch 34 on mouse 28. The selection of window 255 through the use of buttons 280 to 283 permits the user to access shut off alarm box 277 "through" window 260. Thus, the window 260 not having been rendered "active" is transparent to the actions of the user, thereby permitting the user to operate on data disposed in an underlying window such as, for example, accessing the shut off alarm box 277 in the example of FIG. 10. It will be noted that although buttons 285 to 288 and 280 to 283 have been shown to illustrate one method for designating a window as active, a variety of other methods such as icons, highlighted title bars, and mechanisms may be used to accomplish similar results.

In addition to the above described features of the present invention, it will be appreciated that the present invention's use of α values allows windows to be sorted such that the most transparent window is above less transparent windows. By sorting and subsequently displaying windows based on α values, the top window will always be the most transparent (See FIG. 10), with progressively less transparent windows displayed thereunder.

Accordingly, the present invention's use of transparency in a window based system increases the usable area of a display by permitting otherwise obscured window data to be visible to, and operated on, by the user. By appropriately setting the α value, features such as scroll bars, window headers, boarders, icons and other general window data may be rendered fully or partially transparent for the particular application. While the invention has been described with reference to FIGS. 1 through 10, it will be appreciated that the figures are for illustration only and do not limit the spirit and scope of the invention.

We claim:

1. A method for displaying elements on a display, comprising:
   determining a common area on the display shared between at least a portion of a first element and at least a portion of a second element;
   determining a first transparency value for the first element;
   determining at least a second transparency value for the second element;
   merging at least the portions of the first and second elements based on the first and second transparency values;
   automatically sorting the first and second elements such that the most transparent element will appear in front of the least transparent element; and visibly displaying the first and second elements based on the sorted merged portions of the first and second elements in the common area.

2. An apparatus for displaying a plurality of objects on a display, comprising:

means for determining a common area shared between at least a portion of a first element and at least a portion of a second element;

means for merging the portions of the first and second elements in the common area;

means for automatically sorting the first and second elements such that the most transparent element will appear in front of the least transparent element; and means for visibly displaying the first and second elements based on the sorted merged portions of the first and second elements in the common area.

3. A method for displaying a plurality of objects, comprising:

displaying a first element;

determining an area of the first element common to at least a portion of a second element;

adjusting a transparency of the first element in the area common to at least the portion of the second element;

automatically sorting the first and second elements such that the most transparent element will appear in front of the least transparent element; and visibly displaying the least transparent element through the most transparent element based on the adjusted transparency of the first element.

4. The method of claim 3, wherein adjusting a transparency of the first element in the area common to at least the portion of the second element comprises:

displaying a third element indicating a current transparency and a range of transparency for the first element; and adjusting the current transparency for the first element based on input from a user.

5. The method of claim 4, wherein the third element comprises a slider bar element.

6. An apparatus for displaying a plurality of objects, comprising:

means for displaying a first element;

means for determining an area of the first element common to at least a portion of a second object;

means for adjusting a transparency of the first element in the area common to at least the portion of the second object;

means for automatically sorting the first and second elements such that the most transparent element will appear in front of the least transparent element; and means for visibly displaying the least transparent element through the most transparent element based on the adjusted transparency of the first element.

7. A system for displaying a plurality of objects, comprising:

a processor for determining an area of a first element common to at least a portion of a second element, to adjust a transparency of the first element in the area common to at least the portion of the second elements, and automatically sort the first and second elements such that the most transparent element will appear in front of the least transparent element; and a display to visibly display the least transparent element through the most transparent element based on the adjusted transparency of the first element.

* * * * *

UNITED STATES PATENT AND TRADEMARK OFFICE
CERTIFICATE OF CORRECTION

PATENT NO.     : 6,694,486 B2
DATED          : February 17, 2004
INVENTOR(S)    : Frank et al.

It is certified that error appears in the above-identified patent and that said Letters Patent is hereby corrected as shown below:

Column 12,
Line 28, "elements," should read -- element, --.

Signed and Sealed this

Fifteenth Day of June, 2004

JON W. DUDAS
*Acting Director of the United States Patent and Trademark Office*